Dec. 20, 1960 J. R. DONNAY ET AL 2,965,707

VIDEO APPARATUS

Filed March 11, 1958 3 Sheets-Sheet 1

INVENTORS.
JACQUES RENE' DONNAY
YVES BRUNEL
BY [signature]
AGENT

Dec. 20, 1960 J. R. DONNAY ET AL 2,965,707

VIDEO APPARATUS

Filed March 11, 1958 3 Sheets-Sheet 2

INVENTORS.
JACQUES RENÉ DONNAY
YVES BRUNEL
BY [signature]
AGENT

INVENTORS.
JACQUES RENÉ DONNAY
YVES BRUNEL
BY [signature]
AGENT

United States Patent Office 2,965,707

Patented Dec. 20, 1960

2,965,707

VIDEO APPARATUS

Jacques René Donnay and Yves Brunel, Paris, France, assignors to Société Nouvelle de l'Outillage R.B.V. et de la Radio-Industrie, Paris, France Filed Mar. 11, 1958, Ser. No. 720,673

Claims priority, application France Mar. 11, 1957

4 Claims. (Cl. 178—6)

This invention relates to improvements to video apparatus for a plurality of video channels transmitting video signals. It relates more particularly, in the scope of this apparatus to a switching device destined, during a transmission, to substitute signals to others which take their place for a predetermined and adjustable duration after which the first signal is automatically switched on again.

According to the invention, the switching device is designed for a plurality of intelligence carrying channels substituting one given channel to any other one for an adjustable predetermined period and at an externally controlled time, said switching occurring at a moment when no intelligence is transmitted, the reverse switching being automatically effected at the end of said predetermined period at a moment when no information is transmitted.

The invention will be better understood by reference to the following description of the invention with the accompanying drawings.

Figure 1 gives an example of use of the device according to the invention,

The device according to the invention has been designed to be used directly by the operator sitting at his desk, in connection with a video mixer; in order to simplify the description, the device according to the present invention will be described associated with the video mixer described in French Patent No. 1,096,674. This example does not provide of course any limitation to the scope of the invention, the considered device being able to be used associated with other equipments, as for example, with that, object of U.S. application S.N. 410,170, "Video Mixer for Television Transmissions."

Figure 1:
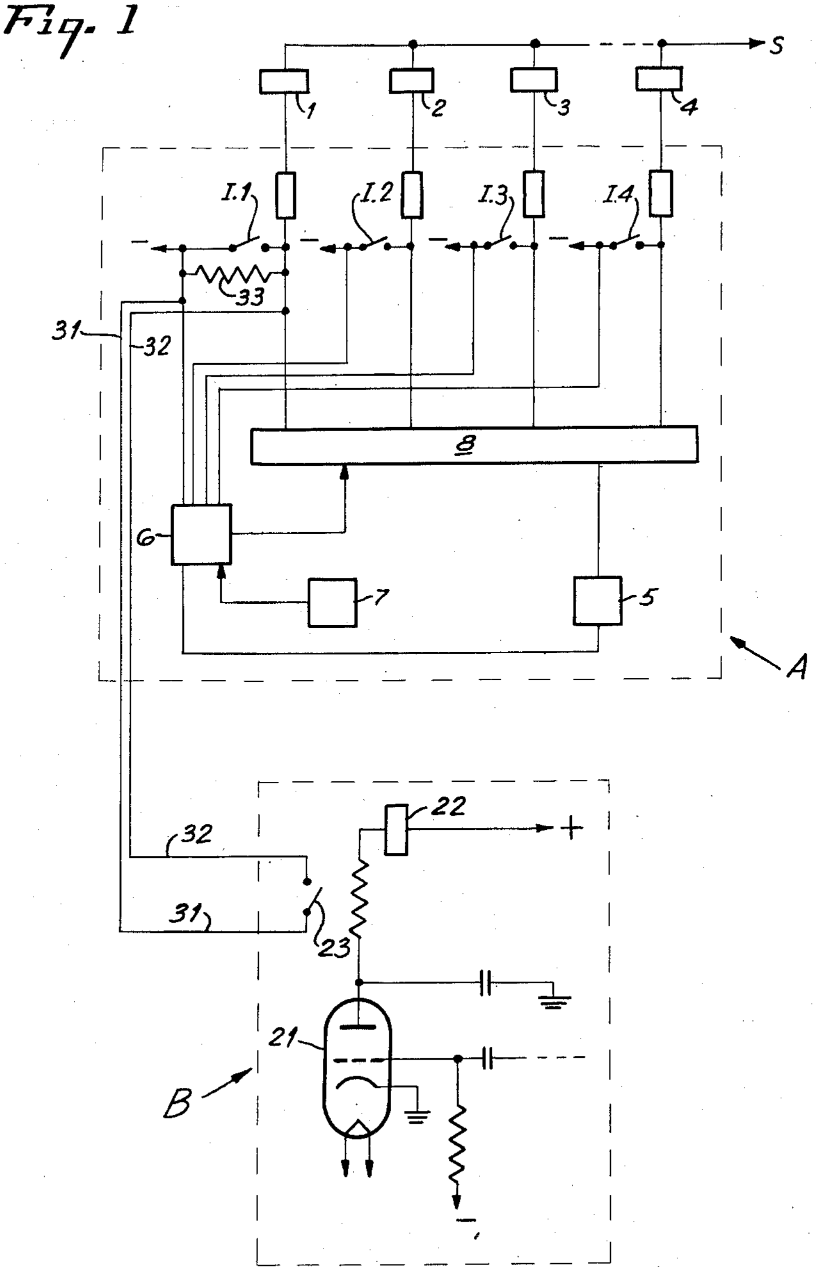

On Figure 1, in the rectangle A, a simplified diagram of a channel selector has been represented, which can be associated with the device object of the invention and drawn schematically in rectangle B. The numbers 1, 2, 3, 4 refer to several video channels, one of which should be connected to the associated output circuit S. The switching from one video channel to another should be effected only during the period in which the field blanking pulse which follows immediately the control of the operation is transmitted. This switching is triggered during this period by a line synchronziation pulse. The field synchronizing pulses issuing from 5 feed a bistable electronic switch 6. This switch is series connected between the line synchronizing pulses source 7 and the electronic selector 8. The electronic selector operates only when the line synchronizing pulses from generator 7 feeding the selector 8 and the field synchronizing pulses from generator 5 controlling the electronic switch 6 are both present. The choice of one of the channels 1 to 4 is performed by the manual control by the operator of one of the mechanical switches $I_1$ to $I_4$. This manual control renders the selector sensitive as it is explained in the above-mentioned application. The selector 8 comprises essentially an electronic counter, the count of which is predetermined by the state of the mechanical switches $I_1$ to $I_4$, each channel being connected to the suitable point of the counter. This selection is designed so that the choice of one channel blocks automatically the other channels. This use of an electronic counter as constitutive part of the electronic selector is responsible of the fact that a preferential choice is performed upon the channels the rank of which is of lower order.

In the above described video selector, it is necessary, in order that the switching takes place, that a manual control be made by the operator. When the switching of the channels has been realized, the new selection is kept on till a new manual control is performed which determines a change in the choice of the channels. On the contrary, in the device object of the invention, there is an automatic resetting to the preceding selection state, without supplementary manual control; this resetting is automatically performed at the end of a period of time the duration of which is adjustable by the operator. In order to make the understanding of this description easier, "auxiliary pictures" will refer to the pictures which are transmitted by the "auxiliary channels" which are switched in place of the main transmitting channels by the substitution device.

Figure 2:
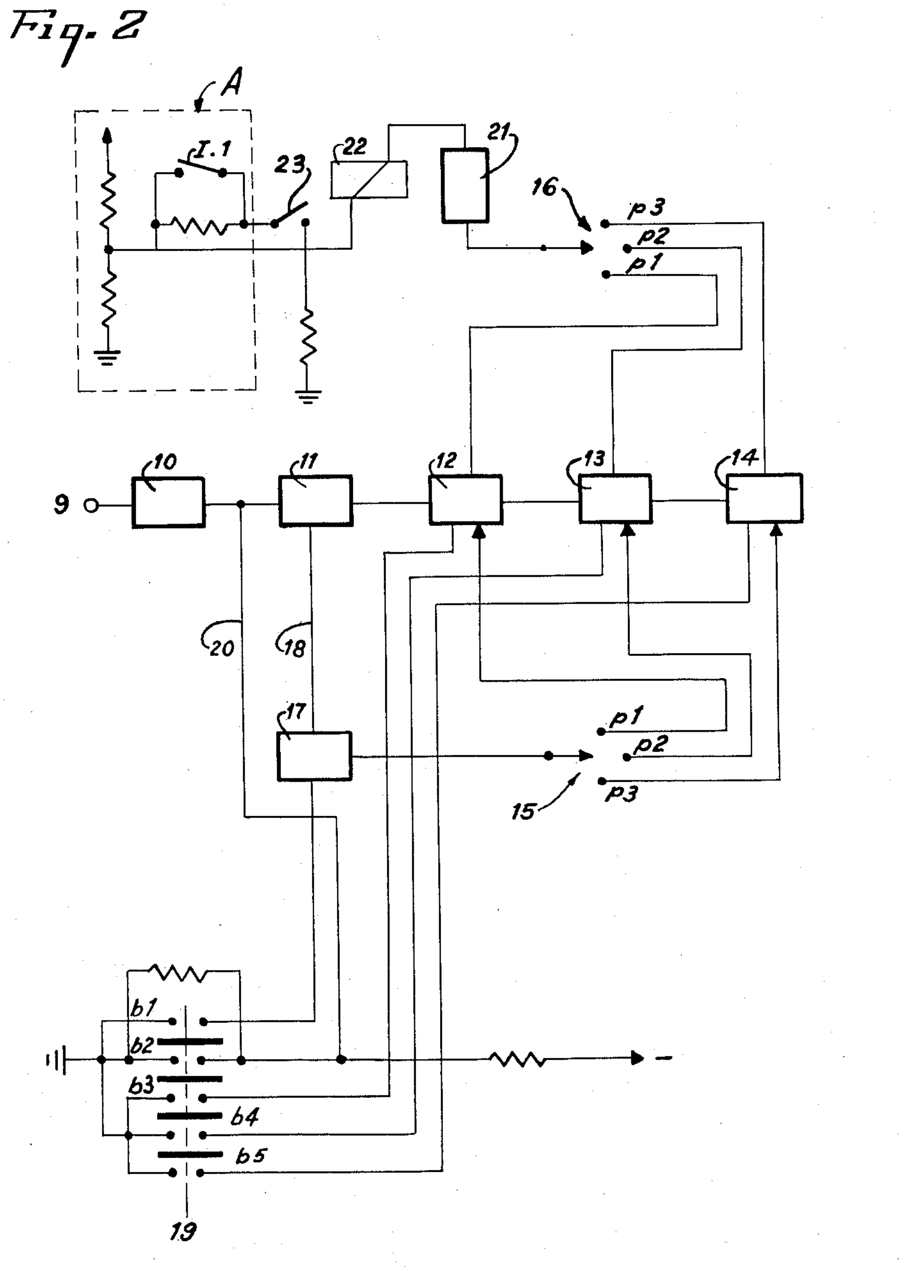
Figure 2 is a schematic diagram of the device.

According to the invention, one or two channels of the video selector as represented on Figure 1 are reserved to the transmission of the auxiliary pictures to be substituted to the normal pictures; these channels are of low order. In the description below, it is assumed that channel 1 is selected to be an auxiliary channel. The device, object of the invention, is shown on Figure 2. The line and field synchronizing pulses are generated in source 9 which feeds, through a separating network 10 and a shaping network 11, the counting units 12, 13, 14 of an electronic counter; the unit 12 counts 1, the unit 13 counts 2, and the unit 14 counts 4, these units defining durations which cover 1, 2 or 4 fields perfectly well determined. Two three directional switches 15 and 16 allow to fix in advance the durations for which the auxiliary pictures should be substituted to the normal pictures. The circuit 17, connected to switch 15 receives a pulse from the selected unit of the electronic counter and sends back this pulse, through conductor 18, to the shaping network 11 which, under this condition is blocked preventing the succeeding field synchronizing pulses to feed said electronic counter. A push button 19 which, at rest, sets the counting units 12, 13, 14 in a receptive state, is manually controlled by the operator and unblocks, at the beginning of the operating process of the device, the circuits 11 and 17, allowing the field synchronizing pulses to feed the counting units of the electronic counter. A voltage, issuing from the counting unit which is operated is applied to relay 22 through the switch 16 and the amplifier circuit 21. The relay 22 is energized and closes its make contact 23. The resulting action is the same as would have been that undergone by the operator actuating the switch associated to a determined channel. The selected channel is of low rank (channel 1) which provokes automatically the blocking of the channels of a higher rank through which the normal program is transmitted. At the end of the chosen time interval, which is being varied according to the selected counting unit 12, 13 or 14 of the electronic counter, the energizing circuit of relay 22 is no longer supplied, and the relay 22 releases, opening its contact 23 and the corresponding channel. The normal program will automatically resume through its channel, the switch of which has not been operated; this process goes on till the operator depresses again the push button 19.

Figure 3:
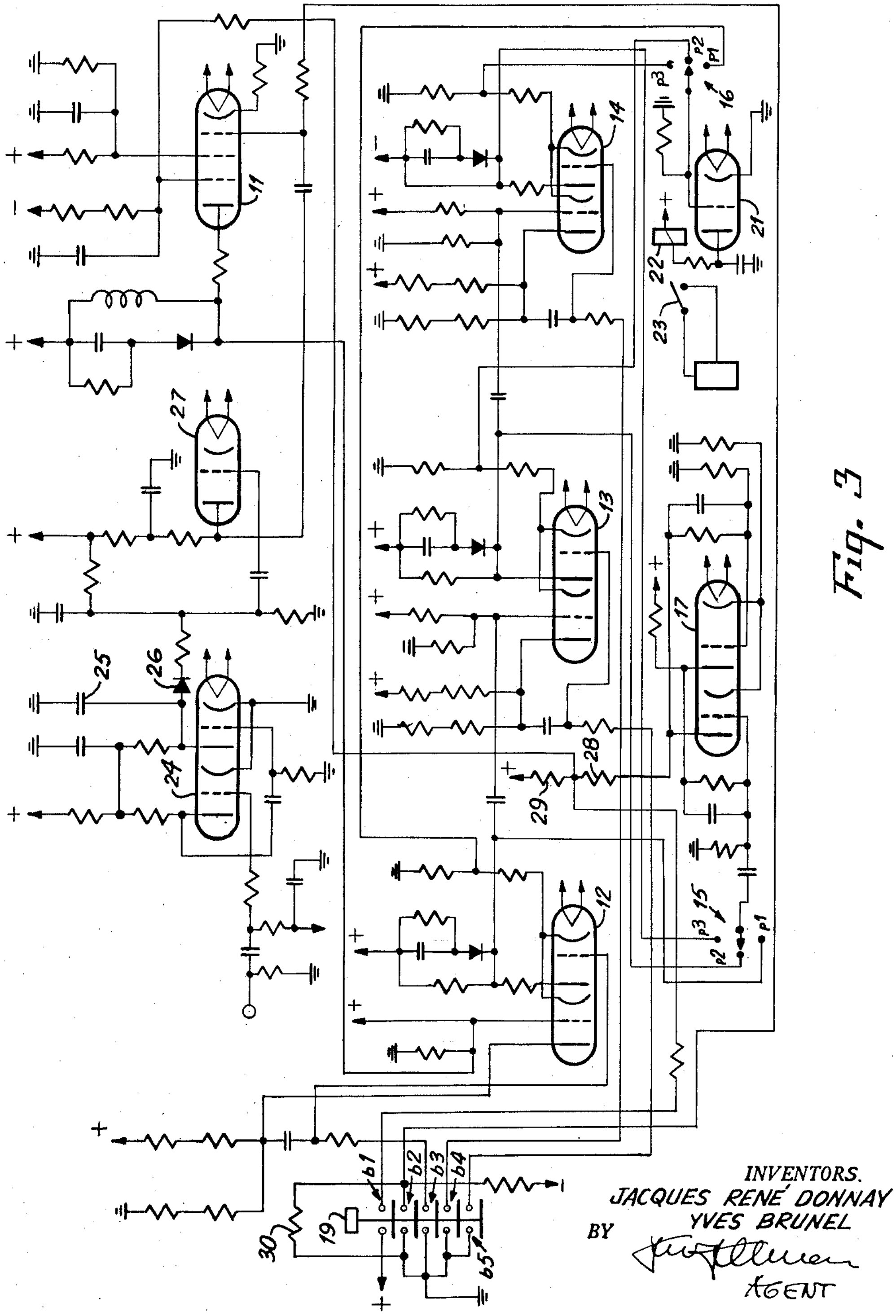
Figure 3 is a realization of the device as used in Figure 1.

Figure 3 shows an example of realization of the device object of the invention. The line and field synchronizing pulses appear at input 9; these pulses are amplified and limited in the double triode 24; the separation network is constituted by the assembly of condenser 25 and diode 26. This separation network acts as an integration network. The separated field synchronizing pulses are applied to the control grid of the triode tube 27 where they are amplified, appearing in negative polarity at the control grid of tube 11. To switch two channels, the operator depresses the push button 19; the control grid of tube 11 is connected to terminal $b_2$; the potential of the grid rises and the tube 11 conducts; the field synchronizing pulses pass through tube 11 applying to the control grid of the first counting unit of the electronic counter; if it is assumed that, by way of example, the switches 15 and 16 are respectively on their positions $p_1$ and $p'_1$, the voltage appearing on the second plate of tube 13 is applied to the control grid of the bistable circuit 17. This circuit changes its state and the voltage as taken at terminals of resistance 28, causes the voltage on the suppressor grid of tube 11 to decrease, blocking the tube, and preventing the succeeding field synchronizing pulses to pass towards the electronic counter. The voltage drop between the terminals of the cathodic resistance 29 of tube 12, for example, is applied through the terminal $p'_1$ of switch 16, to the control grid of tube 21, the plate circuit of which comprises the energizing winding of relay 22. This relay energizes and closes its make contact 23; this contact completes a circuit which unblocks the selected channel. When the transmission of the auxiliary pictures through the selected channel has ended, that is when the time imparted to this transmission is over, the energizing winding of relay 22 is no longer supplied and the relay 22 releases, opening its contact 23. Under these conditions, and according to the characteristics of the device of Figure 1 which have been given above, the transmission is automatically resumed on the normal channel.

When the operator stops depressing the push button 19, the counting units 12, 13 and 14 of the electronic counter are reset to their previous receptive state; the terminal $b_1$ which is connected to a positive potential source puts the suppressor grid of tube 11 to a zero potential value but without unblocking this tube since the control grid of said tube 11 is negatively polarized, due to the resistor 30 which is no longer short circuited.

Reporting again to Figure 1, one sees that the connection of the device, object of the invention, to the video selector to which it may be associated, is made by conductors 31 and 32. When the make contact 23 of relay 22 is closed, the switch $I_1$ is short circuited by the resistance 33. This resistance secures the selection of the channel 1, in the same conditions as though the switch $I_1$ would have been actuated by the operator himself.

In the above description (Figure 3) it has been assumed that the mobile contacts of switches 15 and 16 were respectively set upon terminals $p_1$ and $p'_1$; this implies that the pictures which were substituted to the pictures of the normal program had a duration no longer than one field. If it is desired that the auxiliary pictures be visible over two or four fields, the mobile contacts of switches 15 and 16 have only to be set respectively upon terminals $p_2$, $p'_2$ or $p_3$, $p'_3$. The functioning of the device is the same as that which has been described.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What we claim is:

1. A switching unit for substituting a channel circuit for another channel circuit in operation, for a time interval after which said other channel is switched on again, said unit comprising: an input; an electronic counter for counting electrical pulses; gate means series connected between said input and said counter, said gate means having a control input; control means coupled to said control input for actuating said gate, thereby coupling said input to said counter and initiating the counting; and switching means having a first and a second active position respectively coupled to said one channel circuit and to said other channel circuit, said means being controlled by said counter for substituting said first active position for said second active position as long as said counter is counting.

2. In a video apparatus comprising a plurality of video channel circuits a switching unit for substituting a channel circuit for another channel circuit in operation, for a predetermined and adjustable duration after which said other channel circuit is switched on again, said unit comprising: an input; an electronic counter for counting electrical pulses; gate means series connected between said input and said counter, asid gate means having a control input; control means coupled to said control input for actuating said gate, thereby coupling said input to said counter; means for deenergizing said control means upon said counter stopping the counting of said pulses; and switching means having a first and a second active position respectively coupled to said one channel circuit and to said other channel circuit, said means being controlled by said counter for substituting said first active position for said second active position as long as said counter is counting.

3. In a video apparatus, comprising a plurality of video channel circuits, a switching unit for substituting a channel circuit for another channel circuit in operation for a predetermined and adjustable duration after which said other channel circuit is switched on again, said unit comprising: an input; an electronic counter for counting electrical pulses comprising at least one input and two outputs; first and second switching means for presetting the count of said counter, respectively connected to said one input and in parallel to said two outputs; gate means series connected between said input and said counter, said gate means having a control input; control means coupled to said control input for actuating said gate, thereby coupling said input to said counter; third swiching means having a first and a second active position respectively coupled to said one channel circuit and to said other channel circuit, said means being controlled by said counter for substituting said first active position for said second active position as long as said counter is counting; said counter further comprising means for deenergizing said third switching means and said control means upon said counter having counted said preset count.

4. In a video apparatus comprising a plurality of video channel circuits, a switching unit for substituting a channel circuit for another channel circuit in operation for a predetermined and adjustable duration after which said other channel circuit is switched on again, said unit comprising: an input; an electronic counter for counting electrical pulses, comprising at least one input and two outputs; first and second switching means for presetting the count of said counter; gate means series connected between said input and said counter, said gate means having a control input; control means coupled to said control input for actuating said gate, thereby coupling said input to said counter; third switching means having a first and a second active position respectively coupled to said one channel circuit and to said other channel circuit, said means being controlled by said counter for substituting said first active position for said second active position as long as said counter is counting; said first and second switching means being respectively coupled between said counter and said third switching means and between said counter and said control means.

References Cited in the file of this patent

UNITED STATES PATENTS

| | | |
|---|---|---|
| 2,698,382 | Uglow | Dec. 28, 1954 |
| 2,767,312 | Toulon | Oct. 16, 1956 |
| 2,799,727 | Segerstrom | July 16, 1957 |
| 2,843,655 | Gottfried | July 15, 1958 |